United States Patent
Anderson

[11] 3,832,836
[45] Sept. 3, 1974

[54] HARVESTER ROLL STRUCTURE

[75] Inventor: Sidney Elmer Anderson, Geneseo, Ill.

[73] Assignee: Deere & Company, Moline, Ill.

[22] Filed: Nov. 28, 1973

[21] Appl. No.: 419,612

[52] U.S. Cl. ............... 56/104, 130/5 J, 130/5 H
[51] Int. Cl. ............................................. A01f 11/06
[58] Field of Search ......... 56/104; 130/5 R, 5 H, 5 J

[56] References Cited
UNITED STATES PATENTS

| 1,647,936 | 11/1927 | Schuld | 130/5 J |
| 2,779,337 | 1/1957 | Tener | 130/5 J |
| 3,462,928 | 8/1969 | Schreiner et al | 56/104 |

Primary Examiner—Antonio F. Guida

[57] ABSTRACT

A harvester roll structure composed of a gear housing and a rigid elongated shaft sleeve fixed to the gear housing which supports a roll drive shaft. The drive shaft has one end projecting from the sleeve. A hollow harvesting roll is fixed to the exposed end of the shaft and projects therefrom over and in surrounding relationship to the sleeve. Fixed to the sleeve and projecting into the spacing between the sleeve and the hollow roll is a spiral rib which cooperates with the roll as it rotates to expel material from the spacing between the sleeve and roll.

5 Claims, 3 Drawing Figures

FIG. 1
FIG. 3
FIG. 2
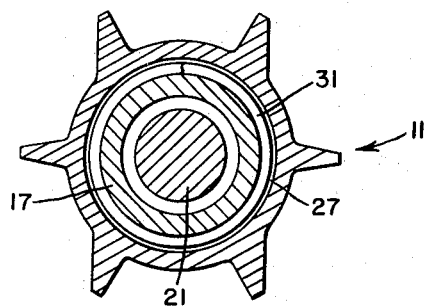
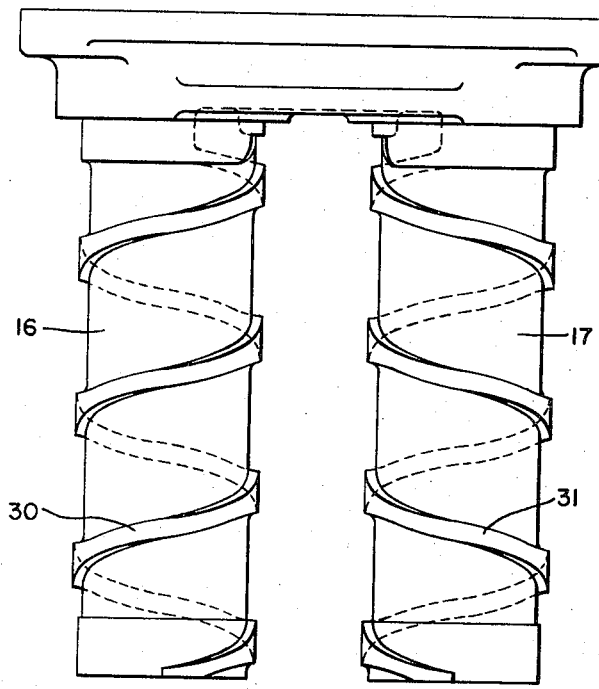
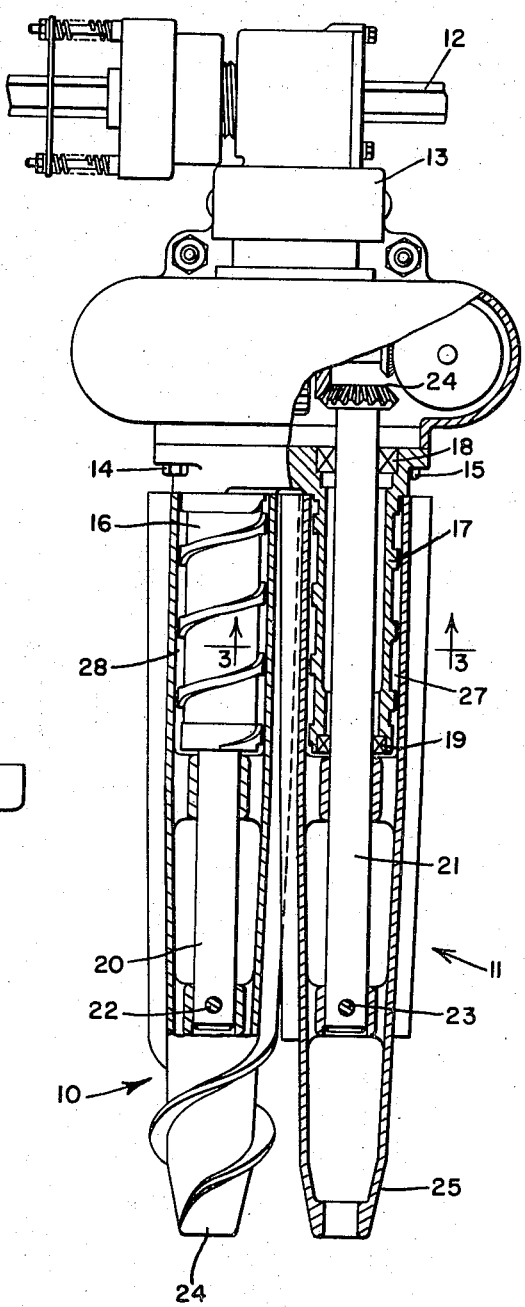

HARVESTER ROLL STRUCTURE

BACKGROUND OF THE INVENTION

It has heretofore been known to provide a harvesting roll structure in which there are normally two cooperating harvesting rolls. Each roll is positioned to project from a gearbox that contains the end of the main drive shaft for the roll. Surrounding the shaft and supporting it is a sleeve that is rigidly fixed to the gearbox. The opposite end of the drive shaft projects from the end of the sleeve. A harvesting roll is fixed to the exposed end of the shaft and extends therefrom over the sleeve. There is normally a spacing between the sleeve and the harvesting row. In such an arrangement, dirt and other foreign material may move into the spacing from the gearbox end of the harvesting roll and eventually move down into the end of the sleeve that is adjacent the bearings within the sleeve. It is not uncommon for dirt and other such material to become completely packed in this area and work its way into the bearings to thereby cause premature failure of the roll structure. Also, often the dirt and other foreign matter become so packed in this area that the friction caused thereby as the rolls rotate create extreme heat and breakage of the drive gears for the shaft may occur.

SUMMARY OF THE INVENTION

With the above in mind, it is the primary object of the invention to provide means in the spacing between the sleeve and harvesting roll which expels material entering into the spacing. More specifically, since there is relative rotation between the fixed sleeve and the rotating roll, there is provided a spiral bead on the external surface of the sleeve that cooperates with internal surface of the rotating roll to guide material out of the spacing and at the open end of the harvesting roll.

BRIEF DESCRIPTION OF THE DRAWINGS

FIG. 1 is a plan view with portions thereof removed and portions shown in section of a harvesting roll device incorporating the structure of the present invention.

FIG. 2 is a plan view of the shaft sleeves shown in FIG. 1.

FIG. 3 is a large sectional view taken substantially along the line 3—3 of FIG. 1.

DESCRIPTION OF THE PREFERRED EMBODIMENT

The present row structure is one that is normally used on a corn harvester where two cooperating harvesting rolls, here indicated in their entirety by the reference numerals 10, 11, are positioned side by side and cooperate with one another so that upon rotation, their adjacent sides always move downwardly to draw the corn stalks downwardly between them. The purpose of such rotation is to force the ears off of the stalks through direct contact with the rows or to draw the ears downwardly into contact with snapping bars which detach the ears from the stalks. Such a combination is shown in U.S. Pat. No. 3,462,928, which issued to Lester D. Schreiner and Joseph J. Shindelar on Aug. 26, 1969. In the particular type of drive shown, there is provided a main drive shaft 12 that extends through the rear end of a gear housing, indicated in its entirety by the reference numeral 13. Bolted, as at 14, 15, to the gear housing 13 is a pair of shaft sleeves 16, 17 that project forwardly from the gear housing and carry journals 18, 19, for respective drive shafts 20, 21. As can clearly be seen from viewing FIG. 1, the shafts 20, 21 project forwardly of the respective sleeves 16, 17 to provide exposed ends on which the rolls 10, 11 are mounted, pins 22, 23 being provided to lock the rolls on the respective shafts. The rear ends of the shaft 20, 21 are provided with bevel gears, one of which is shown at 24, that are in turn driven through suitable gearing not shown but contained in the gear housing 13. The entire gear structure, while not shown in the present invention, may be similar to that shown in the aforesaid U.S. Pat. No. 3,462,928. The gear drive drives the shafts 20, 21 so that the adjacent sides of the rolls 10, 11 move downwardly for the purpose aforesaid. Reviewing FIG. 1, it is clearly apparent that the sleeves 16, 17 extend a substantial length of the respective shafts 20, 21 but do permit an extended or exposed end of the shafts to project beyond them. The rolls 10, 11 are generally hollow and have tapered end portion 24, 25 adjacent the pins 22, 23. From the latter end portions, the rolls project rearwardly and generally overlie the sleeves 16, 17. The overlying portions of the rolls 10, 11 are spaced radially outwardly of the respective sleeves 16, 17 to provide spacings 27, 28 between the inner surfaces of the rolls 10, 11 and the outer surfaces of the sleeves 16, 17.

Referring to FIG. 2, the sleeves 16, 17 are provided with ribs or projections 30, 31 respectively. The ribs 30, 31 are fixed to the surface of the respective sleeves and are spiraled around those surfaces and terminate at substantially the same location as the ends of the rolls 10, 11.

In operation, the structure of the present invention operates as follows. As the shafts 20, 21 and the rolls 10, 11 respectively rotate in the aforedescribed manner, the internal surfaces of the rolls cooperate with the spiraled ribs 30, 31 to expel material at the rear or open ends of the respective rolls. This material may be dust, dirt, small particles of the harvested material and trash that is associated with the harvesting operation. It should here be noted that the spiral ribs 30, 31 are formed on the respective sleeves so that the normal operation of the rolls 10, 11 moves dirt against the ribs and causes it to auger out of the axial upper end of the spacings or openings between the respective sleeves and rolls. The ribs 30, 31 extend substantially the full width of the spacing between the sleeves and rolls and, consequently, will prevent trash from moving forwardly into the journaled ends of the sleeves.

I claim:

1. A harvesting roll structure extending from a gearbox comprising: an elongated rigid sleeve fixed to and extending from the gearbox and having internal journal means; a drive shaft journaled on the journal means and extending from one end inside of the gearbox to an exposed end projecting from the sleeve; an axially-extending hollow harvester roll having a portion thereof fixed to the exposed end of the drive shaft, said roll portion and said sleeve having internal and external surfaces respectively radially opposite to and exposed to one another; and projection means on at least one of said surfaces disposed in the spacing between the surfaces and operative to expel material that may move into the spacing upon rotation of the roll.

2. The invention described in claim 1 in which the projection means is a spiral bead fixed to one of the surfaces and extending into the spacing.

3. The invention described in claim 2 in which the spiral bead is fixed to the surface of the sleeve and extends across the spacing to closely adjacent the internal surface of the roll.

4. In a crop harvesting unit having a gear housing and a pair of rotating and substantially parallel rotating shafts extending from the housing, the improvement residing in a harvesting roll structure comprising: a pair of shaft sleeves fixed to the housing and projecting therefrom in surrounding relation to substantial lengths of the respective shafts to thereby expose the ends of the respective shafts, said sleeves having spiral outer surfaces; and a pair of harvesting rolls fixed to the ends of the shafts to rotate therewith, said rolls being hollow and extending over the spiraled surfaces of said sleeves, the surfaces of said rolls opposite said spiraled surfaces being radially offset therefrom and cooperative with the respective spiral surfaces to expel incidental foreign material moving in the areas between the rolls and sleeves as said shafts and rolls rotate.

5. A harvesting roll structure composed of a shaft sleeve fixed against rotation; a driven shaft internal of the sleeve having one end thereof projecting from the shaft; a hollow harvesting roll having a portion thereof fixed to the shaft, to rotate therewith and extending axially therefrom over the sleeve to an end thereof and in a surrounding and radial-spaced surrounding relation with respect to the sleeve so as to provide a radial spacing between the sleeve and roll that opens axially at said end; and projection means on the surface of the sleeve cooperative with the roll when it rotates to expel material that may enter the spacing at said end of the roll.

\* \* \* \* \*